US008432050B2

(12) United States Patent
Rowan et al.

(10) Patent No.: US 8,432,050 B2
(45) Date of Patent: Apr. 30, 2013

(54) METHOD AND APPARATUS FOR GRID LOSS RIDE-THROUGH FOR WIND TURBINE PITCH CONTROL SYSTEM

(75) Inventors: Paul John Rowan, Pittsburgh, PA (US); Stephen P. Jones, Cecil, PA (US); Alan Duane Cleland, Prospect, PA (US)

(73) Assignee: Windurance, LLC, Coraopolis, PA (US)

( * ) Notice: Subject to any disclaimer, the term of this patent is extended or adjusted under 35 U.S.C. 154(b) by 407 days.

(21) Appl. No.: 12/668,499

(22) PCT Filed: Jul. 12, 2007

(86) PCT No.: PCT/US2007/015854
§ 371 (c)(1),
(2), (4) Date: Aug. 4, 2010

(87) PCT Pub. No.: WO2009/008863
PCT Pub. Date: Jan. 15, 2009

(65) Prior Publication Data
US 2010/0295304 A1 Nov. 25, 2010

(51) Int. Cl.
*F03D 9/00* (2006.01)
*H02P 9/04* (2006.01)

(52) U.S. Cl.
USPC .......................................................... 290/44

(58) Field of Classification Search .............. 290/44, 290/55, 50, 52
See application file for complete search history.

(56) References Cited

U.S. PATENT DOCUMENTS

| | | | |
|---|---|---|---|
| 4,446,376 A | 5/1984 | Baker | |
| 5,907,192 A | 5/1999 | Lyons et al. | |
| 6,771,903 B1 | 8/2004 | Cousineau | |
| 6,819,086 B2 | 11/2004 | Wobben | |
| 6,921,985 B2 | 7/2005 | Janssen et al. | |
| 7,116,006 B2 | 10/2006 | McCoin | |
| 7,126,236 B2 | 10/2006 | Harbourt et al. | |
| 7,218,012 B1 | 5/2007 | Edenfeld | |

(Continued)

FOREIGN PATENT DOCUMENTS

| | | |
|---|---|---|
| CN | 1860372 | 11/2006 |
| DE | 10335575 | 3/2005 |

OTHER PUBLICATIONS

U.S. Department of Energy, How Wind Turbines Work (Jul. 4, 2007), available at http://www1.eere.energy.gov/windandhydro/wind_how.html.

(Continued)

*Primary Examiner* — Javaid Nasri
(74) *Attorney, Agent, or Firm* — Simpson & Simpson, PLLC

(57) ABSTRACT

In a wind turbine/generator having a rotatable hub, at least one blade rotatably secured to the hub, a pitch control system for adjusting pitch of each blade, the pitch control system located within the rotatable hub, a stationary nacelle, and a slip ring assembly at a junction of an electrical circuit between the rotatable hub and the stationary nacelle, the slip ring assembly operatively arranged for transmission of electrical signals between equipment located within the rotating hub and equipment located within the stationary nacelle, an apparatus for grid loss ride-through for the pitch control system, comprising for example, operational amplifiers for sensing and monitoring power on the rotating side of the slip ring assembly, and, a contactor coil, for example, for supplying power to the pitch control system from a backup power source when the sensed power drops to a predetermined level.

13 Claims, 8 Drawing Sheets

U.S. PATENT DOCUMENTS

| | | | |
|---|---|---|---|
| 7,355,294 B2* | 4/2008 | Teichmann | 290/44 |
| 7,489,122 B2* | 2/2009 | Jurisch | 324/142 |
| 2002/0097085 A1 | 7/2002 | Stapleton | |
| 2002/0130556 A1 | 9/2002 | Hohri | |
| 2003/0223868 A1 | 12/2003 | Dawson et al. | |
| 2005/0046194 A1 | 3/2005 | Wobben | |
| 2005/0122083 A1 | 6/2005 | Erdman et al. | |
| 2006/0001268 A1 | 1/2006 | Moroz | |
| 2006/0267560 A1 | 11/2006 | Rajda et al. | |
| 2007/0018457 A1 | 1/2007 | Gonzalez | |
| 2007/0057516 A1 | 3/2007 | Mever et al. | |
| 2007/0080666 A1 | 4/2007 | Ritter et al. | |
| 2007/0085343 A1 | 4/2007 | Fortmann | |
| 2007/0090797 A1 | 4/2007 | Glosser, Jr. et al. | |
| 2007/0267873 A1 | 11/2007 | Teichmann | |
| 2008/0030027 A1 | 2/2008 | Erdman et al. | |

OTHER PUBLICATIONS

American Wind Energy Association, What are the Basic Wind Turbine Configurations? (Jul. 4, 2007), available at http://www.awea.org/faq/basiccf.html.

American Wind Energy Association, Basic Principles of Wind Turbine Power Production (Jul. 4, 2007), available at http://www.awea.org/faq/basicpp.html.

Money.CNN.com, Maxwell Technologies Obtains License to Patent Covering Use of Ultracapacitors in Wind Turbine Blade Pitch Systems (Jul. 4, 2007), available at http://money.cnn.com/news/newsfeeds/articles/prnewswire/LAM00302072007-1.htm.

Wikipedia, Wind Turbine (Jul. 4, 2007), available at http://en.wikipedia.org/wiki/Wind_turbine.

E.ON Netz GmbH, Wind Report 2005 (2005).

* cited by examiner

METHOD AND APPARATUS FOR GRID LOSS RIDE-THROUGH FOR WIND TURBINE PITCH CONTROL SYSTEM

CROSS-REFERENCE TO RELATED APPLICATIONS

This application claims the benefit of International Application No. PCT/US2007/015854, filed Jul. 12, 2007 which application is incorporated herein by reference.

TECHNICAL FIELD

The present invention relates generally to wind turbines, more specifically to pitch control systems for wind turbines, and, even more specifically, to a method and apparatus for grid-loss ride-through for a wind turbine pitch control system.

BACKGROUND ART

As is well known, a wind turbine is a machine that converts the kinetic energy in wind into mechanical energy. If the mechanical energy is used directly by machinery, such as a pump or grinding stones, the machine is usually called a windmill. If the mechanical energy is converted to electricity, the machine is called a wind generator. Wikipedia, http://en.wikipedia.org/wiki/Wind_turbine. Wind turbines can be further categorized by structure and orientation based on the axis about which the turbine rotates. Turbines that rotate about a horizontal axis are called horizontal-axis wind turbines (HAWT), whereas those that rotate about a vertical axis are called vertical-axis wind turbines (VAWT). HAWTs are more common than VAWTs. Wikipedia, supra.

In principle, producing electric power with wind is a simple process. Most HAWT turbines have three large blades mounted to a rotating hub. The blades are aerodynamically designed to turn as easily as possible when the wind blows on them (the number of blades may vary). The turning blades spin a shaft, which connects through a gearbox to a generator that produces electricity. The gearbox and generator are mounted in a nacelle which, in turn, is mounted atop a tower. As the wind blows over the turbine blades they create "lift", much like an airplane wing, and begin to turn. The spinning blades turn a low-speed shaft at a relatively low speed, usually 30-60 rpm. The gearbox connects the low-speed shaft with a high-speed shaft that drives the generator. The gearing also boosts the rotation speed of the high-speed shaft to the operating speed of the generator. This operating speed may vary, but is usually in the range of 900-1800 rpm. This rapidly spinning shaft drives the generator to produce electric power. The generator's electrical output is connected to the larger electrical grid. Typically, large capacity generators provide polyphase voltages at a controlled frequency synchronized to the grid. The generator outputs are connected to the grid via suitable transformers.

The blades themselves can also be turned, or pitched, about their longitudinal axes, out of the wind, to control the rotor speed and keep the rotor from turning in winds that are too high or too low to produce electricity. They can also be pitched to a "feather" position to prevent rotation in the event of an emergency. (The wind turbine also typically includes an emergency braking system to stop rotation in the event of an emergency.) The blades are rotated about their longitudinal axes by a pitch control system. There are several different ways of doing this, including actuators and motors. The pitch control system, which comprises motors or actuators and associated power supplies and control electronics, is conventionally mounted in the rotating hub of the turbine. Power is supplied to the pitch control system from slip rings which transmit power from a stationary bus/supply mounted in the nacelle. The power supply for the pitch control system can come from a number of sources. It can be provided by the main grid itself via appropriate transformers, or it can be provided by the generator driven by the turbine.

Historically, wind turbines have contributed a very low percentage of the world's energy demands. But depletion of natural resources such as oil and natural gas, associated higher prices for these resources, and political ramifications associated with reliance on foreign oil, are changing the energy generation landscape. The industry is responding with turbines of higher capacities (ratings of 1.5 MW or more), better technology, and wind farms having large numbers of wind turbines. As recently reported by CNNMoney.com, "Wind energy industry sources reported that approximately 15,000 megawatts of new wind energy generation capacity was installed worldwide in 2006, an increase of 25 percent from 2005. The industry has maintained an average growth rate of more than 17% for the past five years, and industry estimates project a similar growth rate and a total wind energy equipment market value of more than $180 billion for the next five years." http://money.cnn.com/news/newsfeeds/articles/prnewswire/LAM00302072007-1.htm. These statistics and forecasts are confirmed by E.ON Netz, the German transmission system operator of the E.ON Group, who reported in 2005, "In 2004, Germany was once again the global world leader in the production of wind power. At the end of 2004, wind energy plants with an installed capacity of 16,400 MW supplied the German electricity grids . . . . According to grid studies by the Deutsche Energie-Agentur (dena), wind power capacity in Germany is expected to increase to 48,000 MW by 2020, around a threefold increase since 2004 . . . . This means that Germany remains the world's undisputed number one generator of wind energy. In 2004, Germany accounted for approximately one third of the world's and half of Europe's wind power capacities . . . . In total, German wind farms generated 26 billion kWh of electricity, which is around 4.7% of Germany's gross demand." Wind Report 2005, E.ON Netz. In the past, when wind turbines played a negligible role in power generation, they could be largely ignored when considering grid stability. This is no longer the case.

In response to this growth in the wind turbine industry and its impact on the national grid, the Federal Energy Regulatory Commission ("FERC") has proposed minimum requirements for wind plant response to certain low-voltage conditions on the utility power grid. These requirements require that wind turbines stay connected to the grid during prescribed transient "grid-loss" conditions. Similar requirements are being mandated by grid connection and regulatory authorities throughout the world. Generally, they describe the voltage falling immediately at t=0 to a substantially reduced level such as 10 or 15% of nominal line level and then gradually returning to at least 80% of nominal line level within three seconds of t=0. The levels are considered to be all three phases combined and not with regard to the individual phases. The aggregated requirements of FERC, E.ON Netz (Germany), HECO (Hawaii), and the Spanish grid authority, for example, can all be satisfied by one simplified power loss profile described as follows: the pitch control system should continue to operate normally when the AC mains voltage level falls below 80%, and as low as zero, and remains below 80% for at least as long as three seconds, at which time the AC main level returns to a minimum of 80% of nominal line level.

This continued operation of the pitch control system is referred to in the industry as "ride-through" capability. It broadly describes the ability of the pitch control system to function during a "grid loss" condition, i.e., a condition which cuts power to the pitch control system for any number of reasons. Interestingly, not everyone in the industry defines "grid loss" in the same way, or attempts to solve the same problem, much less in the same way. For purposes of this patent, we define grid loss as any condition that interrupts power to the pitch control system of a wind turbine/generator. This can be caused in a number of ways, including but not limited to, a fault in the main grid; a problem with the pitch control AC power supply (short or other fault); a defective slip ring; a broken conductor, or the like. To understand the present invention, it is important to note that the pitch control system is traditionally housed within the rotating hub of the turbine. The system needs power to operate. As is well-known in the electrical arts, the most common way of transmitting power from a stationary source to a rotating load is via slip rings. It should also be appreciated that "grid loss" as defined herein can occur on either side of the slip rings—on either the stationary or rotating side of the circuit. It is important and necessary to detect the loss wherever it may occur, and take corrective action accordingly. With this in mind, we briefly review patented inventions and published patent applications by others who have addressed problems with wind turbines.

U.S. Pat. No. 6,921,985 (Janssen et al.) discloses a low voltage ride-through solution for wind turbine generators. The patented invention includes a turbine controller and blade pitch control system which are connected to a first power source (AC grid) during a first mode of operation, and to a second source (backup power) during a second mode of operation, i.e., during grid power loss. The turbine controller senses a transition between the two power modes and varies the pitch of one or more blades in response to the transition. The patent also teaches that the turbine controller detects a low voltage event through coupling to sensors which provide data indicating the status of various wind turbine generator system components, for example, rotor speed and generator output voltage. When low voltage is sensed the controller transitions between AC power and UPS power. Janssen et al. measure grid voltage at the transformer, i.e., on the stationary side of the pitch control circuit. Unfortunately, what this means is that if the invention of Janssen et al. was to lose a slip-ring, the patented invention wouldn't detect it.

United States Patent Application Publication No. 2005/0122083 (Erdman et al.) discloses a generator with utility ride-through capability. This publication teaches measuring voltage from either a single phase or from all three phases of the low side of the main grid transformer, but teaches that amplitude of the signal is unimportant. The application teaches that frequency and phase are much more important. The system uses a phase-locked loop scheme to produce a current command signal in a scheme which controls frequency and phase of the generated voltage from the wind turbine, and maintains the phase-locked loop signal during a brief fault. Erdmann et al. are silent as to the exact voltage measurement point, saying only that, "A frequency and phase angle sensor 8 is connected to the utility grid at an appropriate point to operate during a fault on the grid." (Paragraph 31). It appears that the reference does not teach measuring at the slip rings on the rotating side of the pitch control circuit. Also, Erdmann et al. is largely silent as to powering the pitch control system during a ride through, i.e., the publication doesn't teach a pitch control system arranged to operate during grid loss.

United States Patent Application Publication No. 2006/0267560 (Rajda et al.) discloses a device, system, and method for providing a low-voltage fault ride-through for a wind generator park, i.e., for a plurality of wind turbine/generators. The system uses a resistor bank to absorb power and a control system that maintains collector bus voltage above a threshold voltage during the duration of low-voltage condition on the power grid. The invention in this application monitors voltage levels on the collector bus, i.e., the bus coupled through a transformer to the wind turbine driven generator, and not on the rotating side (slip ring side) of the pitch control circuit.

United States Patent Application Publication No. 2007/0057516 (Meyer et al.) discloses a pitch control battery backup method and system. The published application describes an invention which uses a passive method for controlling a pitch control system via a charged backup battery which provides no power to a DC link when full AC power is available, but uses power from the DC link (including a capacitor) when AC power is lost or dips below a threshold level. The patent application is silent as to the method used to sense AC power loss, mentioning "sensor" only generically.

What is needed, then, is a method and apparatus for grid loss ride-through for a wind turbine pitch control, and especially for a method and apparatus that senses grid loss on the rotating side of the pitch control circuit, i.e., proximate the slip rings.

DISCLOSURE OF INVENTION

In a wind turbine/generator having a rotatable hub, at least one blade rotatably secured to the hub, a pitch control system for adjusting pitch of each blade, the pitch control system located within the rotatable hub, a stationary nacelle, and a slip ring assembly at a junction of an electrical circuit between the rotatable hub and the stationary nacelle, the slip ring assembly operatively arranged for transmission of electrical signals between equipment located within the rotating hub and equipment located within the stationary nacelle, an apparatus for grid loss ride-through for the pitch control system, comprising means for sensing and monitoring power on the rotating side of the slip ring assembly, and, means for supplying power to the pitch control system from a backup power source when the sensed power drops to a predetermined level.

A general object of the invention is to provide a method and apparatus for grid loss ride-through for a pitch control system in a wind turbine/generator.

A more particular object of the invention is to provide a method and apparatus for grid loss ride-through for a pitch control system in a wind turbine/generator which senses and monitors grid loss (power supply voltage) on the rotating side of the slip rings that provide an electrical connection between the stationary side (nacelle) and the rotating side (hub) of the turbine.

Even a more particular object of the invention is to provide a method and apparatus for grid loss ride-through for a pitch control system in a wind turbine/generator which senses and monitors grid loss (power supply voltage) on the rotating side of the slip rings that provide an electrical connection between the stationary side (nacelle) and the rotating side (hub) of the turbine, and connects the pitch control system to a backup power supply when the monitored AC supply voltage falls to a predetermined level. In a preferred embodiment, the system measures all three phase voltages and connects the backup power supply when the absolute value of the sum of the squared value of all three phase voltages drops below 80% of nominal line level. The pitch system continues to operate normally even when the AC main voltage has dropped below 80%, and as low as zero, for at least as long as three seconds.

When the AC main voltage returns to 80% or above nominal, the system switches back to AC main supply and disconnects the backup power supply.

These and other objects, features and advantages of the present invention will become readily apparent to those having ordinary skill in the art upon reading the following detailed description of the invention in view of the drawings and claims.

BRIEF DESCRIPTION OF DRAWINGS

The invention will be explained in greater detail below with reference to the drawings.

BEST MODE FOR CARRYING OUT THE INVENTION

Figure 1:
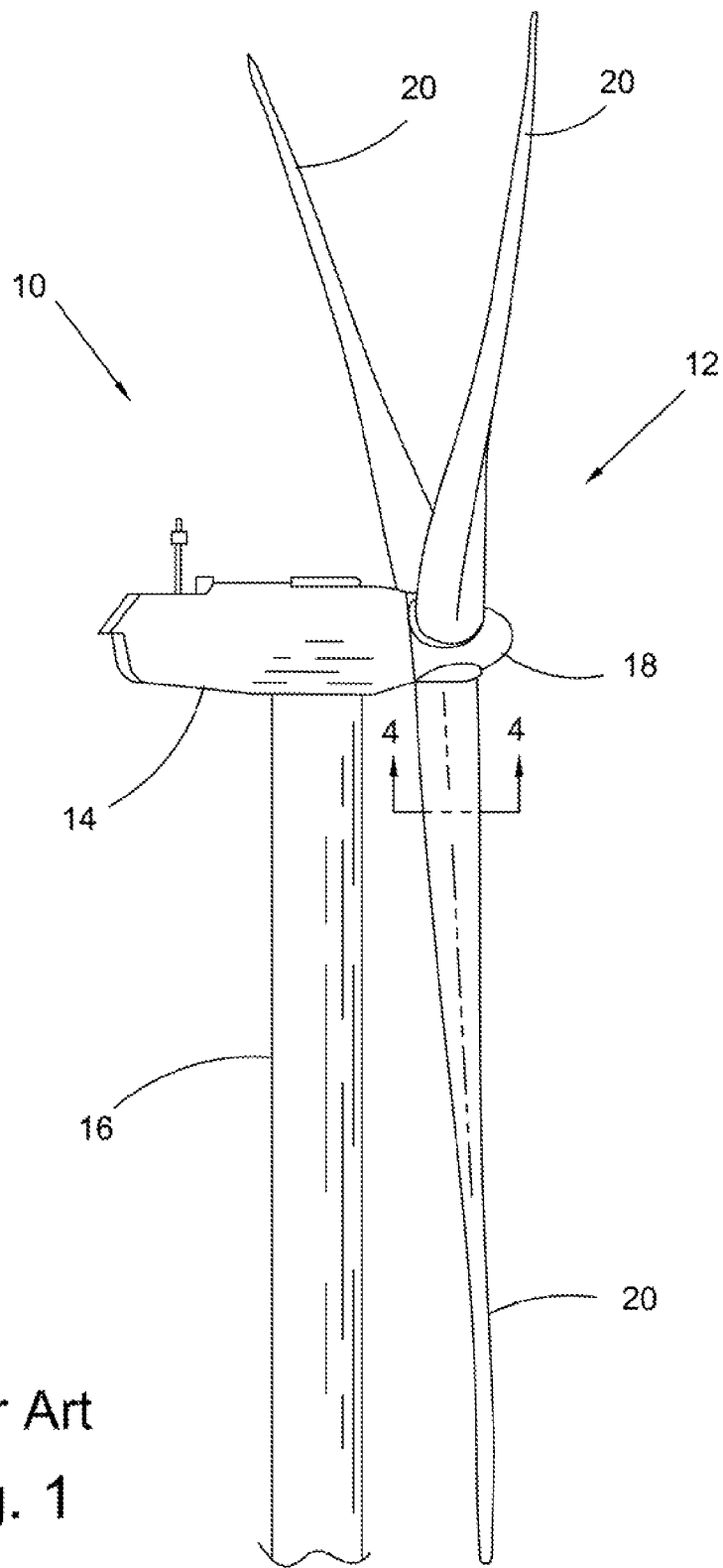
FIG. 1 is a side perspective view of a typical prior art wind turbine.

Adverting now to the drawings, FIG. 1 is a side perspective view of wind turbine 10. Wind turbine 10 generally comprises hub assembly 12 rotatably secured to nacelle 14, such as by bearings or some other method known in the art. The nacelle is mounted atop tower 16, which is of sufficient height to allow hub assembly 12 to fully rotate at a safe distance above the ground. In a preferred embodiment, hub assembly 12 comprises three blades 20 rotatably secured to hub 18. The number of blades, of course, may vary in other embodiments. Wind turbines of this general structure are known in the art.

Figure 2:
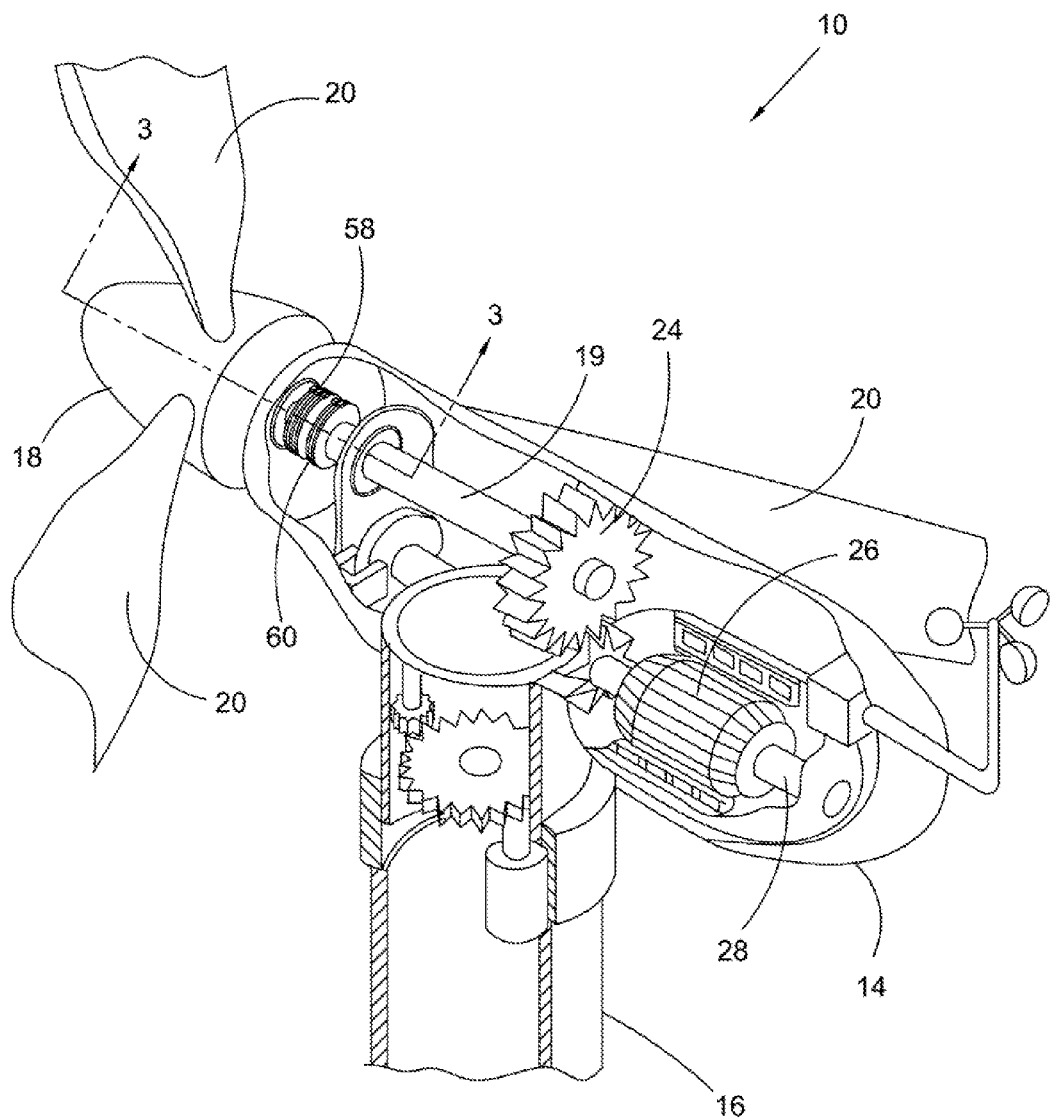
FIG. 2 is a fragmentary perspective view of a section of the wind turbine shown in FIG. 1.

FIG. 2 shows a fragmentary perspective view of a section, specifically nacelle 14, of the wind turbine shown in FIG. 1. Wind causes the hub assembly to rotate, which in turn rotates low-speed shaft 19. The low-speed shaft terminates in gearbox 24, which is a set of gears connecting low-speed shaft 19 to high-speed shaft 28. In a preferred embodiment, gearbox 24 takes a rotational speed of about 30-60 rpm from the low-speed shaft and converts it into a rotational speed of about 900-1,800 rpm for the high-speed shaft. Generator 26, which could be any suitable rotational generator known in the art, is attached to high-speed shaft 28 to generate electricity.

FIG. 2 also illustrates slip ring assembly 61 on low-speed shaft 19. Slip rings are known in the art as electro-mechanical devices for transferring electrical currents from rotating sources to stationary ones. In a preferred embodiment brush holders 66 and 68 are proximate the slip rings to hold the slip ring brushes in place. The disks of the slip rings are secured on a rotatable shaft, so that the disks rotate with the shaft. A spring or other force constantly presses the brushes against the disks so that contact is always made between the disks and the brushes while the disks rotate freely. As a result, an electrical current can be transferred between rotating and stationary components.

Figure 3:
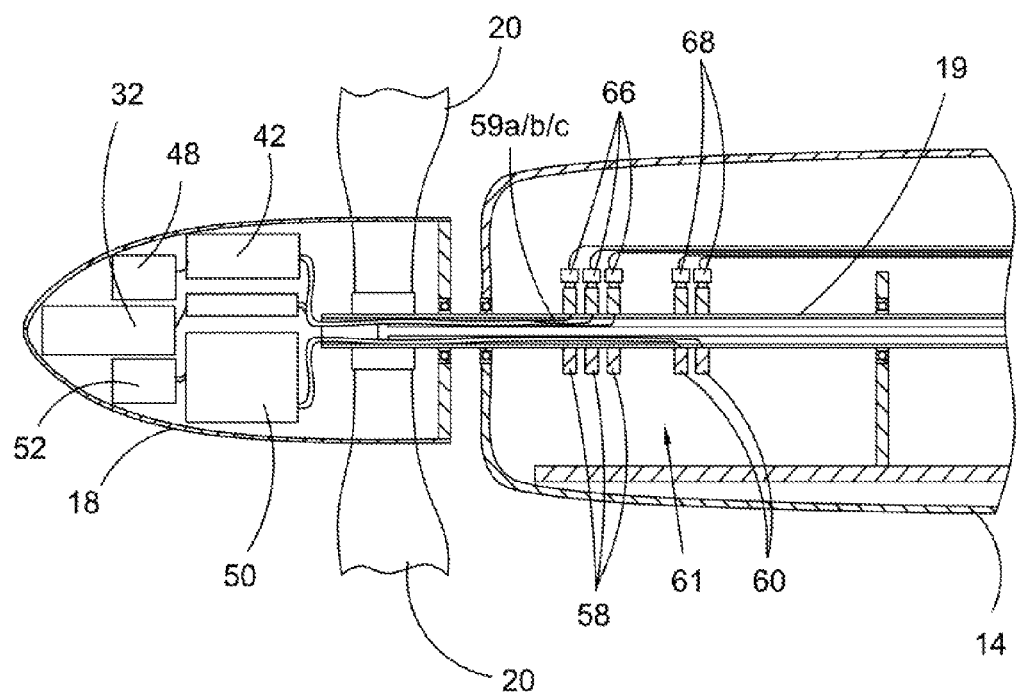
FIG. 3 is a fragmentary cross-sectional view of the hub, blades and nacelle, taken generally along line 3-3 in FIG. 2.

FIG. 3 is a fragmentary cross-sectional view of the hub, blades and nacelle, taken generally along line 3-3 in FIG. 2. Hub 18 is secured to low-speed shaft 19 such that when wind causes the hub to rotate, the hub in turn causes the low-speed shaft to rotate. Wires 59a-c deliver power to the electrical components housed in hub 18. In a preferred embodiment the electrical components housed in hub 18 are essentially pitch control system 30, but could include additional components. Pitch control system 30 may include, but is not limited to, power conversion for pitch motor control module 32, AC to DC conversion module 42, power condition monitor and backup transfer controller 48, system control processor 50, backup power source 52, and actuators, sensors, and other controls as necessary.

Figure 4:
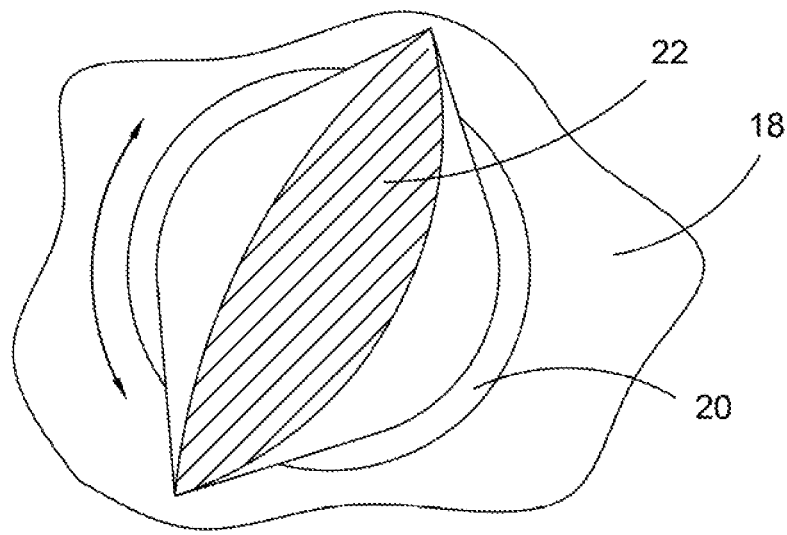
FIG. 4 is a cross-sectional view of one of the blades of the wind turbine of the invention, shown in a first position, taken generally along line 4-4 in FIG. 1.
Figure 5:
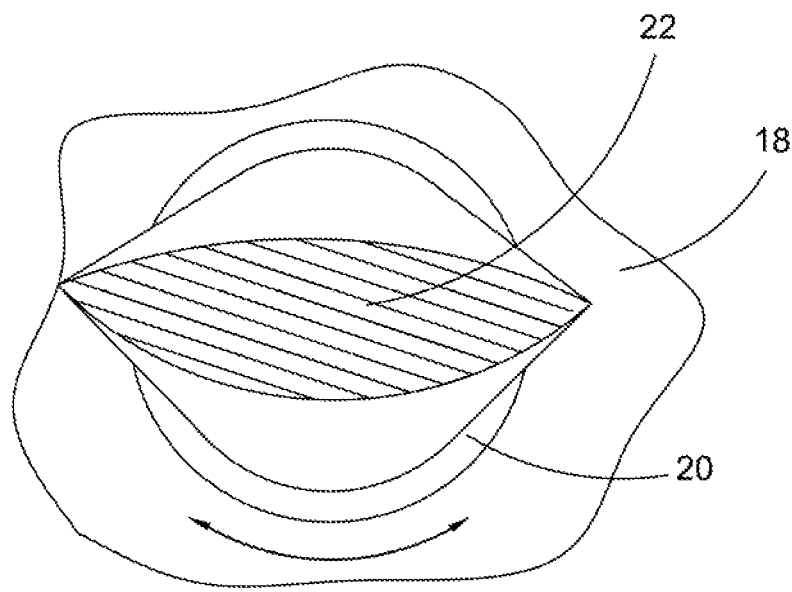
FIG. 5 is a view of the blade shown in FIG. 4 after the pitch of the blade has been adjusted such that the blade is in a second position.

FIGS. 4 and 5 show cross-sectional views of two alternate positions for blade 20. In a preferred embodiment blade 20 is rotationally variable at a plurality of intervals between these two positions. Furthermore, it should be appreciated that it may be desirable in some embodiments to enable blade 20 to be completely rotatable about the axis of the blade. FIG. 4 illustrates blade 20 in a position typical for wind turbine power generation. Assuming that wind is coming in a substantially leftward or rightward direction, blade cross-section 22 presents a large surface for wind to strike. The curvature of the blade generates lift, and ultimately causes the hub assembly to rotate, as is commonly known in the art.

In FIG. 5, the pitch of blade 20 has been changed so that blade 20 is in a "feather" position. The blade is very aerodynamic in the feather position, and allows wind to simply pass over and under the blade, so that there is no net force on either side of the blade. Therefore, wind will not cause the hub assembly to rotate when the blades are in this position. The feather position is typically used in emergency situations, such as extremely high winds or a grid-loss condition. Pitch control system 30 is housed in hub 18 and responsible for rotating each blade 20 about its respective axis.

It is desired for many wind turbines known in the art to be able to sense a grid-loss condition, as defined supra, and "ride-through" the grid-loss condition for a specified period of time, commonly about three seconds. The ride-through primarily involves providing the pitch control system with power for the specified period of time so that blades 20 can be moved into a feather position to prevent damage to the turbines.

Electronic Block Diagram & Schematics

Figure 6:
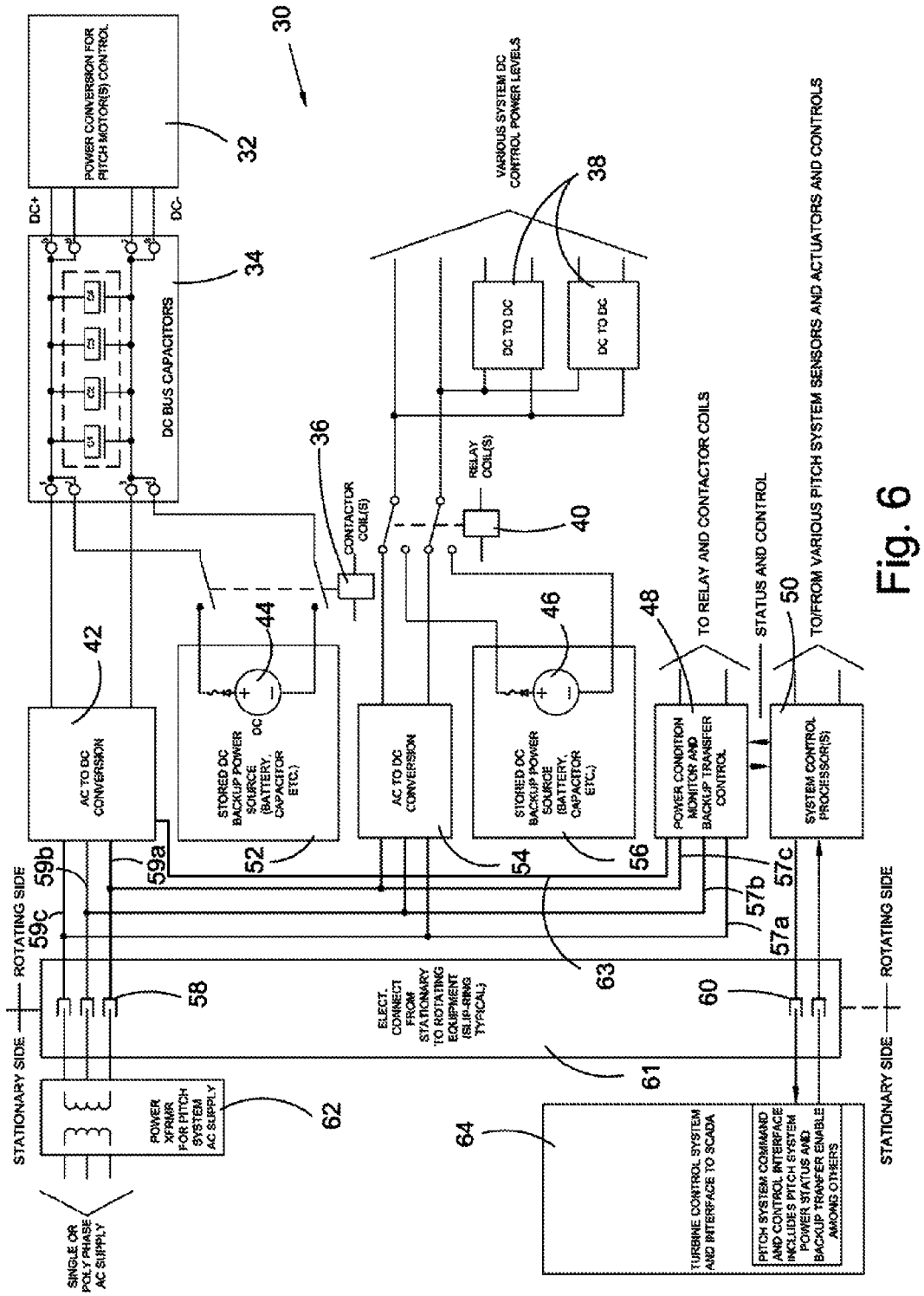
FIG. 6 is a block diagram of the control circuit for the grid loss ride-through pitch control system of the invention; and, FIG. 7 is a schematic diagram of the power condition monitor and backup transfer control circuit of the invention.

FIG. 6 illustrates an electronic block diagram of control system 30 of the present invention. It should be noted that FIG. 6 illustrates a "stationary side" of system 30 and a "rotating side". The two sides are separated by slip ring assembly 61. As is well known in the art, a slip ring is an apparatus for making an electrical connection through a rotating assembly, and provides a means of transferring electricity from a stationary to a rotating component. Slip rings, also called rotary electrical interfaces, rotating electrical connectors, collectors, swivels or electrical rotary joints, are commonly found in generators, alternators, packaging machinery, cable reels, ceiling fans and wind turbines. A slip ring consists of a conductive circle or band mounted on a shaft and insulated from it. Electrical connections from the rotating part of the system, such as the rotor of a generator, are made to the ring. Fixed contacts or brushes run in contact with the ring, transferring electrical power or signals to the exterior, static part of the system. Wikipedia, http://en.wikipedia.org/wiki/Slip_rings.

The equipment on the stationary side of the slip ring assembly is located in nacelle 14, while the equipment on the rotating side is housed in hub 18. Power for pitch control system 30 is provided through transformer 62. The AC supply to this transformer can come from any source. It can be provided directly from the main grid through other transformers, or it can be supplied directly from the generator. In one embodiment, the AC supply is 690 VAC, and the transformer is configured to reduce the voltage to either 400 or 230 VAC for transmission across slip rings 58.

In the present invention, slip ring assembly 61 comprises slip rings 58 and 60. Slip rings 58 are used to transfer supply power across the interface, while slip rings 60 are used to transfer command and control data.

The essence of the present invention is that pitch control system 30 is operatively arranged to sense and monitor AC supply power on the rotating side of the slip rings, and to continue to operate for an engineered period of time, in the event of a partial or total loss of AC supply power. As mentioned previously, the pitch control system of the present invention is operatively arranged to operate normally when the AC mains voltage level falls below 80%, and as low as zero, and remains below 80% for at least as long as three seconds, at which time the AC main level returns to a minimum of 80% of nominal line level. Unlike prior art pitch control and grid loss ride-through systems, the present system measures supply voltage on the rotating side of the slip rings. When supply power dips to a predetermined level, a backup power supply is switched on, and continues to supply power to the pitch control system until the main AC supply voltage returns to a minimum level.

Pitch control system 30 broadly comprises AC to DC conversion module 42 which is operatively arranged to convert the AC supply voltage to DC. In one embodiment, module 42 converts the AC supply voltage to 325 VDC. This DC voltage can be either half-wave or full-wave rectified, and is next provided to DC bus capacitors 34 for filtering and smoothing. Power conversion for pitch motor control module 32 comprises an IGBT inverter or other device for conversion of the DC supply voltage to appropriate AC voltage supplies, as is well known in the art. A second module 54 converts the AC supply to a lower DC voltage, e.g., 24 VDC.

Pitch control system 30 further comprises power condition monitor and backup transfer control module 48, which is a core component of the invention. The power condition monitor module measures the three phase voltages at lines 59a, 59b and 59c. As mentioned previously, this AC supply voltage is monitored on the rotating side of the slip rings. This monitoring scheme has an advantage over prior art methods in that it can detect problems caused by the slip rings, conductors and other parts of the circuit that stationary-side monitoring systems cannot detect. When the quality of the delivered power deteriorates according to predetermined algorithms, the power condition monitor disconnects AC to DC conversion module 42 via a command signal sent via line 63, and then sends signals to relay 40 and contactor coil 36 to connect backup power supplies 46 and 44, respectively. These backup power supplies can take numerous forms, such as batteries or capacitors, etc. These backup power supplies continue to power the pitch control system until main AC supply power is restored (at least to 80% of nominal). It should be appreciated that, although in a preferred embodiment, the triggering point for backup connection and disconnection is 80% of nominal line voltage, this is not a critical number, and other ranges of voltage drops could be employed via simple programming, and any number of algorithms could be used to trigger the backup power switchover. Also, in a preferred embodiment of the invention, the power condition monitor measures voltage at all three phases, but the invention could easily be configured to measure only single phase voltage, or even two of the three phases.

Also shown in FIG. 6 are two backup power sources 52 and 56, respectively. In a preferred embodiment, power source 52 provides 250 VDC to the DC Bus Capacitors, and then to power conversion for pitch motor control module 32 to power the pitch control motors. Power source 56 provides 24 VDC to power various electronic components. For example, the 24 VDC powers brake coils, relay logic, isolated digital I/O signaling. The voltage is further reduced through conventional voltage dividers, etc., to provide 12 VDC for microprocessors, memory, A/D conversion, etc., and 5 VDC for CMOS circuits, as is well known in the art. Although the drawing shows two separate backup power supplies, it should be noted that the backup power supply may comprise a plurality of batteries connected in series, with appropriate taps for 12 VDC and 250 VDC, respectively. The backup power could also be supplied by capacitors.

The power condition monitor 48 also communicates with system control processor 50. System control processor 50 also communicates via slip ring 60 via serial data communication with turbine control system and interface to SCADA module 64. Module 64 represents the main turbine control system which communicates with the pitch control system, commanding pitch control, etc.

Figure 7:
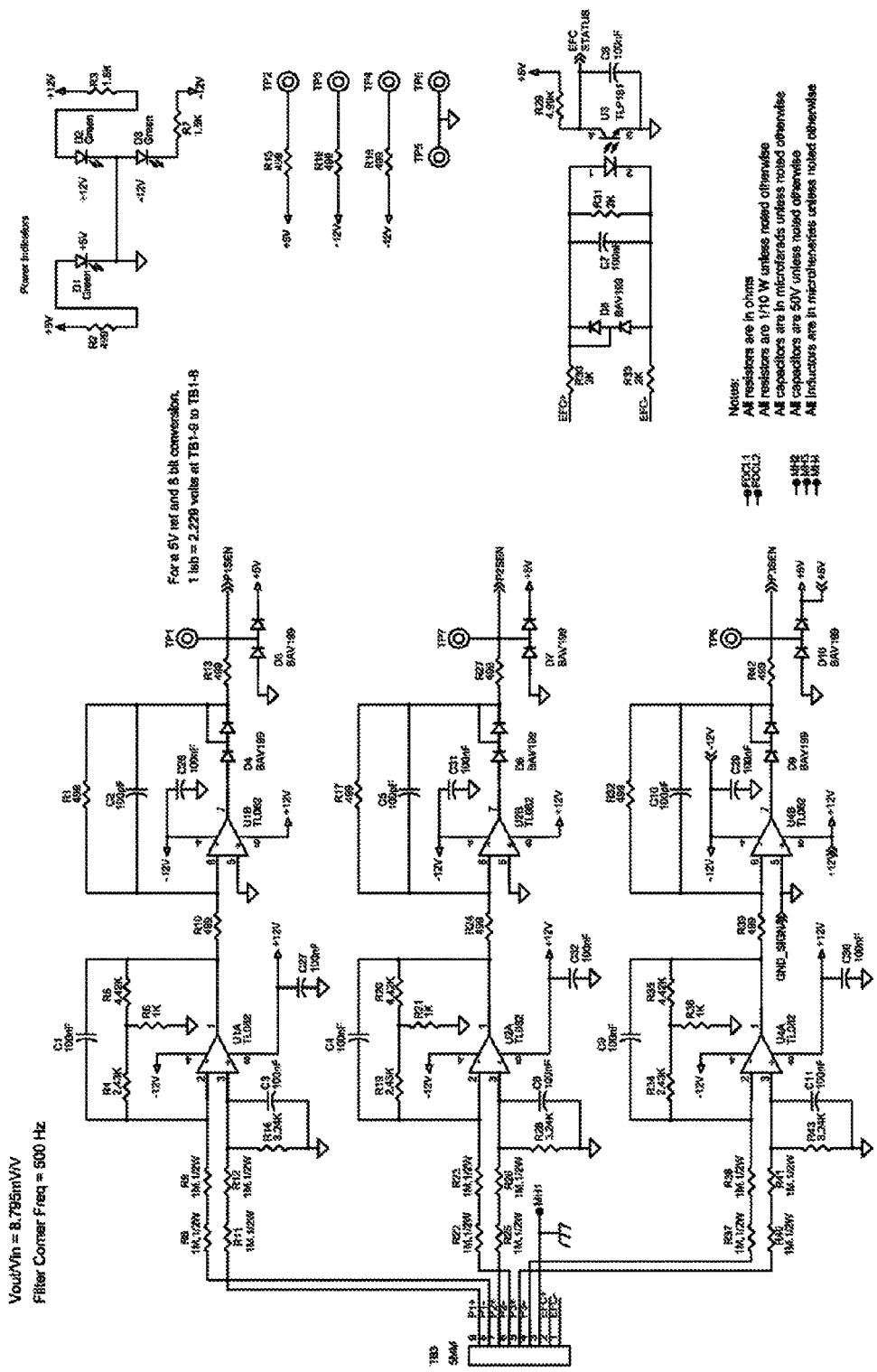

FIG. 7 is a detailed schematic of the circuitry that monitors the AC line voltage. It shows three separate sections of differential amplifier and absolute value circuits connected in series. The differential amplifiers are set up with op amps U1A, U2A, and U4A. The absolute value circuits are set up with op amps U1B, U2B, and U4B. Absolute value circuits are not necessary for the circuitry; they are used in this instance just to make a unipolar signal for the Analog to Digital (A2D) converter input. A bipolar signal could also be used; it would just need to be biased to the center voltage of the A2D converters range. So, the absolute value circuits are just an alternate solution to biasing the signal to midrange of the A2D converter.

The combination of U1A and U1B sense the voltage of phase 1 of the AC line. U2A and U2B sense phase two, while U4A and U4B sense phase three. Again, in a preferred embodiment of the invention, all three phase voltages are sensed, although the invention could also be configured to sense only one of the phase voltages, or any two of the phase voltages. The invention could be configured to sense a delta or wye supply configuration, grounded or ungrounded.

There is no special component for the sensing circuit. It uses generic op amps and the A2D converter of a microprocessor. The microprocessor happens to be from Microchip, but there are many different processors or DSPs that would work.

Examining the phase one sense circuitry, the differential amplifiers are designed to have very good common mode rejection through the configuration of the feedback networks of R4, R5, and R6 along with some noise filtering.

The input of TB3 terminal block (section B5) and the differential amplifiers are configured for various types of AC line configurations. This device can easily be connected to 240 VAC line to line supplies, or to 400 VAC line to line supplies by changing how the signals are connected to terminal block TB3. Certainly, the device could have the intelligence to sense the voltage connected to it and adjust gains accordingly without needing different wiring configurations, or just have enough A2D resolution to allow for sensing a lower voltage input source. But, these are just typical choices on how to implement the general idea while balancing cost, size, complexity, and other concerns.

In sections B2 and B3 there is an input for the status of an emergency signal. This signal will be used to immediately stop a ride-through event and cause the supply to revert back to normal operation even if it has already sensed a power loss and is operating in its power loss mode. It will also prevent a power loss from being detected if it indicates an emergency previous to power loss detection.

Figure 8:
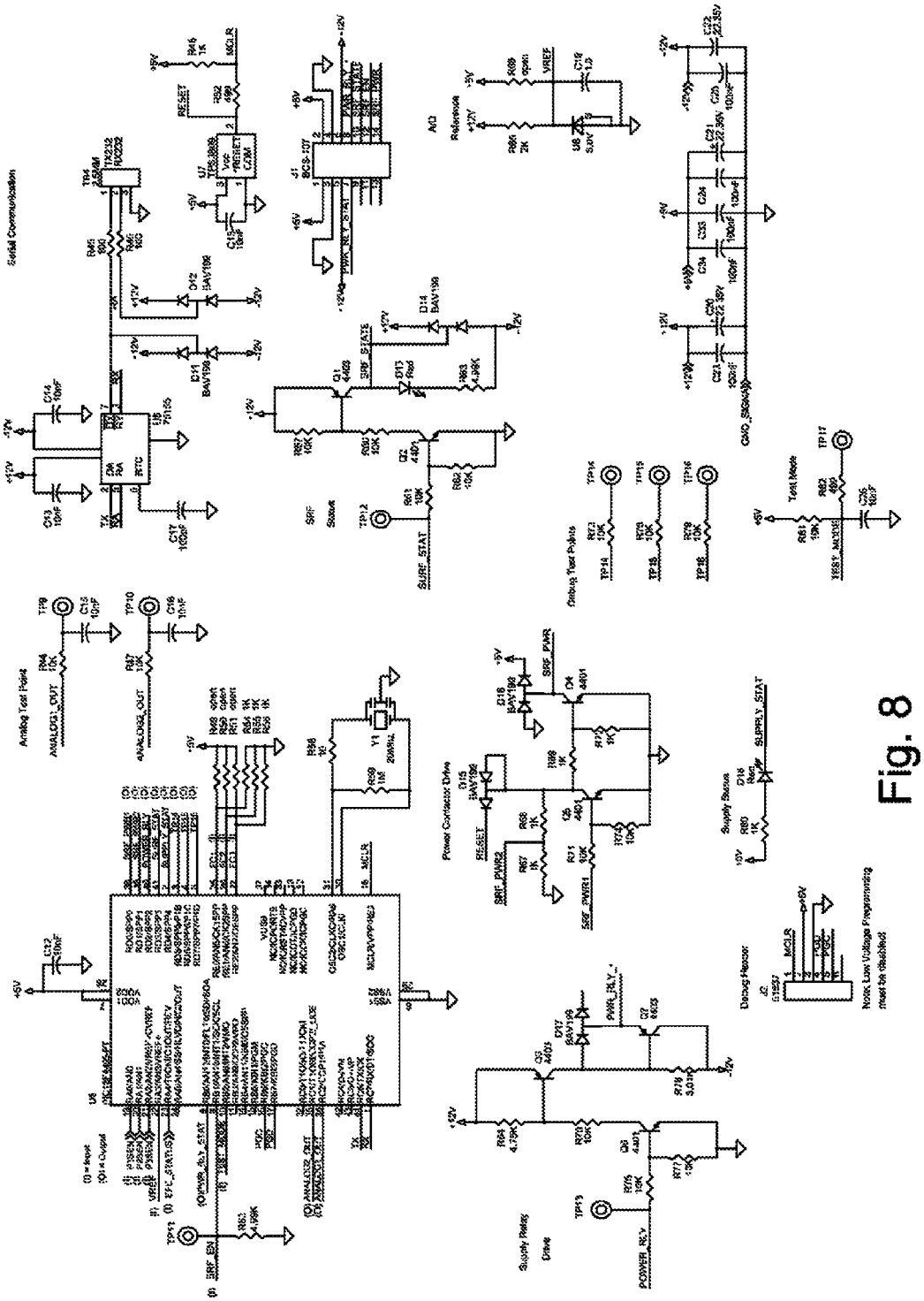
FIG. 8 is an additional schematic diagram for the Power Loss Detector section of the SRF power supply; and, FIG. 9 is a schematic for the logic power supply of the invention.

FIG. 8 is an additional schematic diagram for the Power Loss Detector section of the SRF power supply. It shows processor, PIC18F4455, from Microchip. The processor contains the memory for its program and data variables. Among the other features contained in this processor are a multi-channel Analog to Digital (A2D) converter, digital inputs and outputs, and Pulse Width Modulation (PWM) circuitry including capture and compare capability.

This device monitors the AC line voltages by taking A2D conversions of the three signals representing the AC line voltages, P1SEN, P2SEN, and P3SEN on pins 19, 20, and 21 respectively. To achieve a fast indication of low AC line conditions, the processor squares the value of each of the AC line conversions and adds the three squared values together. If the incoming AC line has a constant peak voltage for all three phases, then this result will be the same number no matter what time the AC line is sampled. Thus, the circuit performs a quick sensing of the loss of the AC line without needing timing information from the AC line. In a preferred embodiment, the samples and square summation calculation for this are taken every 500 microseconds, although they could be taken at different intervals. To prevent falsely triggering a power loss event, multiple samples of a low line condition must be detected to cause the power supply to change its mode of operation.

Signals FC1, FC2, and FC3 (section D/C4) provide a means of selecting characteristics of how the supply operates, such as how many samples of the AC line are needed to trigger a power loss detection event, what the trigger voltage of the AC line should be, what the maximum length of time to operate in the SRF state, or other features or test modes. Similarly, the Serial Communication channel could be used in a similar fashion.

The Analog Test Point section (D3) uses the PWM output capability of the processor to generate some analog test points of data internal to the processor to view with a multimeter or oscilloscope.

The Serial Communication section (D1/2) can be used to set characteristics of the supply as described above, to get the status of the supply, to send out live process data of the supply, to interrogate stored information such as peak AC voltages, length of SRF events, how long the supply has operated and so on, or to reset this stored data.

The Supply Relay Drive (B5) amplifies the output signal of the processor to the level required to operate the relay that connects the 24 VDC source from the backup power source to the input of the supplies that generate the logic and bias supplies for the pitch system.

The Power Contactor Drive section (B3/4) amplifies the output signal of the processor to control the drive circuitry of the main DC bus supply contactor. This section actually requires the processor to provide two separate signals of the correct and opposite polarities in order for the main power contactor to close and remain closed. This is done as an additional hardware barrier to prevent the main power contactor from closing when it shouldn't. This section also uses the output of the reset generator integrated circuit to open the main power contactor if the reset generator senses a low level on the 5V supply.

The SRF Status section (C2) amplifies the output signal of the processor to the level needed for sensing by the Pitch Control Processor (PCP). The PCP will notify the Turbine Controller that a power loss has been detected. The PCP will then monitor the time of the power loss via the SRF Status signal and has the ability to stop the power loss ride through prior to the power supply shutting itself down should the AC line power remain lost. If the AC returns to an acceptable level within the shortest timeout period, the SRF Status signal will indicate that the AC line is once again acceptable for normal operation.

The Supply Status section (A3/4) provides a visual indication of the state of the SRF power supply.

The A/D Reference section (B1) is the precision reference for the A2D converter in the microprocessor.

The Debug Test Points section (B2/3) is intended to aid the debugging of the product as it is developed and can also provide test signals for production testing.

The Test Mode section (A2) is intended as an additional means for placing the power supply in various test modes of operation.

Integrated circuit U7 is a reset generator that monitors the 5V logic supply and generates a fixed reset pulse when the 5V power supply exceeds the threshold level of the reset generator. If the 5V supply is below the threshold level of the reset generator, the processor is placed in reset, and the Power Contactor Drive is turned off, thus opening the power contactor. See #5 above for additional description of the Power Contactor Drive circuit.

J1 (in C0 is the interface connector between the Power Loss Detector circuit board, and the Logic Power Supply board.

Figure 9:
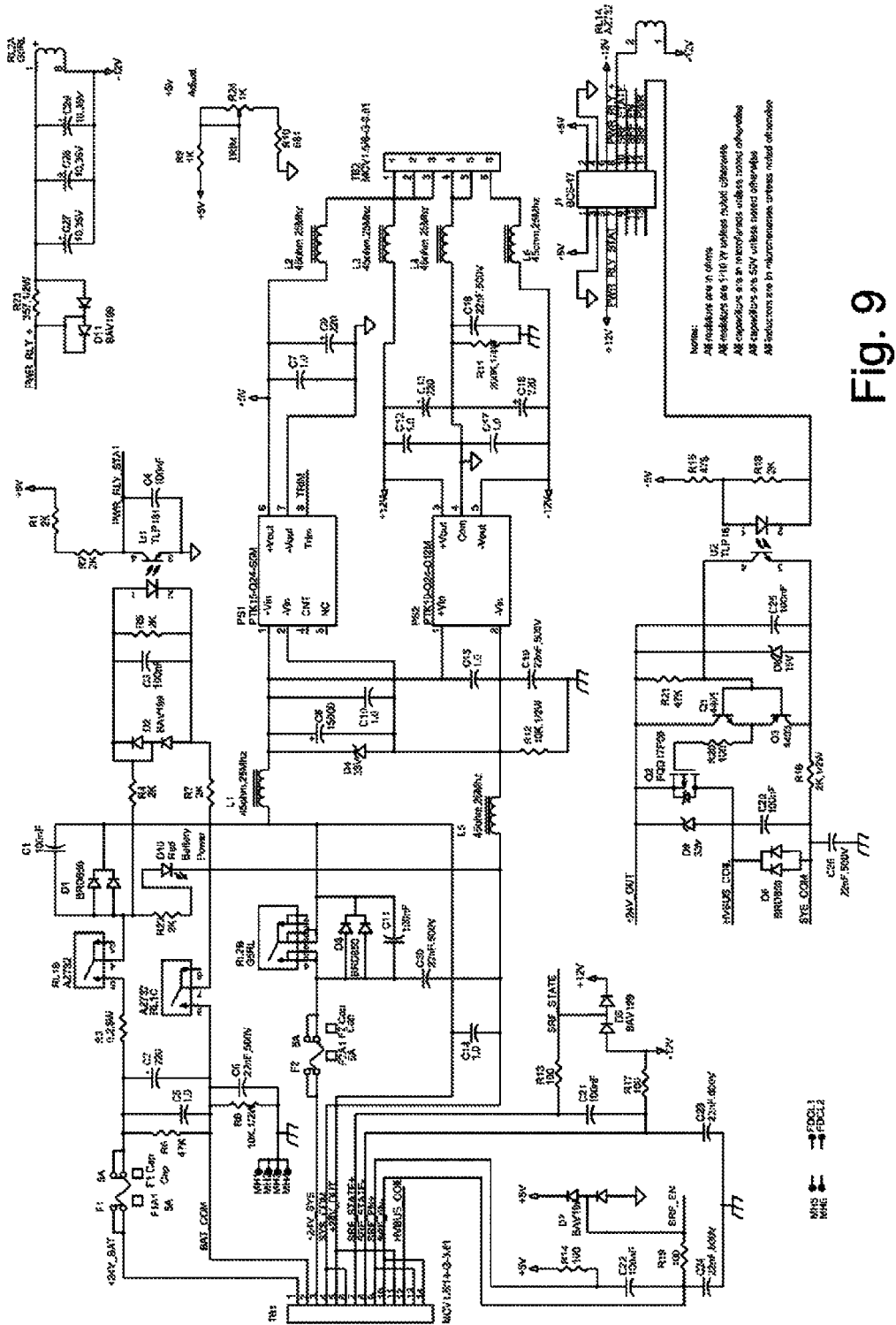

FIG. 9 illustrates a schematic for the logic power supply of the invention. The logic supply assembly provides bias supply power (+5, +/−12V) for use in the pitch system logic and control circuits. Onboard DC converters PS1 and PS2 produce this power. PS1 and PS2 operate from an unregulated 24V input supply. The pitch control system uses +5, +/−12V and the unregulated 24V to power logic circuits, IGBT gate drivers, relay logic, and servomotor brake coils.

To maintain servo pitch operation during an AC power outage, the +5V, +/−12V, the unregulated 24V, and the high power servo bus must be maintained. In a preferred embodiment, the batteries of emergency power units of blades 2 and 3 provide the power for this. The emergency power unit of blade 2 provides 24V battery power for use in the logic supply assembly. The emergency power unit of blade 3 provides the high voltage/high current power (225 VDC) for the pitch control servo bus.

On terminal block TB1 is 24V sys. This is the unregulated 24V power that runs the system relays, brake coils, DC converters during normal operation when AC power is present. This unregulated power comes from a rectified 18 VAC of a control transformer in the system. Also on terminal block TB1 is 24V Bat. This is the battery power that comes from emergency power unit 2. On the terminal block is 24V out. This is the power that outputs from the logic supply assembly and powers the IGBT gate drivers. During normal operation with AC power present, 24V sys is created by the control transformer, powers relay logic, and brake coils of the servomotors. It enters TB1 pins 3 and 4, powers the DC converters PS1 and PS2, and goes back out the 24V out at TB1 pins 5 and 6. In this state, relays RL1 and RL2 are open as they are shown in the schematic.

When AC power is lost, the power monitor assembly senses this and sends a signal to the logic supply assembly to cause relays RL1 and RL2 to close. This connects the 24V Bat supply at TB 1 pins 1 and 2 to the 24V sys terminals and also to the 24V out terminals keeping them powered. Now the 24V Bat source of the emergency power unit 2 is powering PS1, PS2, and the 24V out terminal. At the same time, a signal is sent to energize the power driver circuit of Q2 in the bottom center of the drawing. Q2 in turn energizes a high power contactor located on the panel of the control cabinet which connects the emergency power unit 3 to the high voltage servo bus, keeping it powered. The result is that servo operation continues uninterrupted after AC power is lost, being powered from the batteries of emergency power units 2 and 3.

When AC power returns, the power loss detector sends a signal to the logic supply assembly which opens RL1 and RL2. At the same time a signal is sent to turn off the Q2 circuit and de-energize the high power contactor which connects the emergency power unit 3 to the servo bus. Now the system is being powered from the AC input.

Thus, it is seen that the objects of the invention are efficiently obtained, although modifications and changes to the invention and to its circuits can obviously be made by those having ordinary skill in the art, and these changes and modifications are intended to be within the scope of the appended claims.

What is claimed is:

1. In a wind turbine/generator having a rotatable hub, at least one blade rotatably secured to said hub, a pitch control system for adjusting pitch of each said blade, said pitch control system located within said rotatable hub, a stationary nacelle, and a slip ring assembly at a junction of an electrical circuit between said rotatable hub and said stationary nacelle, said slip ring assembly operatively arranged for transmission of electrical signals between equipment located within said rotating hub and equipment located within said stationary nacelle, an apparatus for grid loss ride-through for said pitch control system, comprising:

means for sensing and monitoring power on the rotating side of said slip ring assembly; and, means for supplying power to said pitch control system from a backup power source when said sensed power drops to a predetermined level.

2. The apparatus recited in claim 1 wherein said means for sensing and monitoring power comprises operational amplifiers configured to measure analog voltages, and a microprocessor operatively arranged to convert said analog voltages to digital signals for further processing.

3. The apparatus recited in claim 2 wherein said means for sensing and monitoring power senses three different phase voltages simultaneously.

4. The apparatus recited in claim 2 wherein said microprocessor is operatively arranged to sum the squares of the sensed voltages and to send a signal to connect a backup power supply when the absolute value of the sum of the sensed voltages falls below 80% of a nominal level.

5. The apparatus recited in claim 1 further comprising means for disconnecting a main power source for said pitch control system when said backup power source is connected.

6. The apparatus recited in claim 1 wherein three phase supply voltages are applied and measured on the rotating side of said slip ring assembly, and said predetermined level is approximately 80% of the absolute value of the sum of the squared value of all three phase voltages.

7. In a wind turbine/generator having a rotatable hub, at least one blade rotatably secured to said hub, a pitch control system for adjusting pitch of each said blade, said pitch control system located within said rotatable hub, a stationary nacelle, and a slip ring assembly at a junction of an electrical circuit between said rotatable hub and said stationary nacelle, said slip ring assembly operatively arranged for transmission of electrical signals between equipment located within said rotating hub and equipment located within said stationary nacelle, a method for grid loss ride-through for said pitch control system, comprising the steps of:

sensing and monitoring power on the rotating side of said slip ring assembly; and, supplying power to said pitch control system from a backup power source when said sensed power drops to a predetermined level.

8. The method recited in claim 7, further comprising the step of disconnecting said backup power source when said sensed power returns to said predetermined level.

9. The method recited in claim 7 wherein said sensing and monitoring power is done with operational amplifiers configured to measure analog voltages, and a microprocessor operatively arranged to convert said analog voltages to digital signals for further processing.

10. The method recited in claim 9 wherein said sensing and monitoring power senses three different phase voltages simultaneously.

11. The method recited in claim 9 wherein said microprocessor operates to sum the squares of the sensed voltages and to send a signal to connect a backup power supply when the absolute value of the sum of the sensed voltages falls below 80% of a nominal level.

12. The method recited in claim 7 further comprising the step of disconnecting a main power source for said pitch control system when said backup power source is connected.

13. The method recited in claim 7 wherein three phase supply voltages are applied and measured on the rotating side of said slip ring assembly, and said predetermined level is approximately 80% of the absolute value of the sum of the squared value of all three phase voltages.

* * * * *